United States Patent [19]

Tu

[11] 4,246,289
[45] Jan. 20, 1981

[54] NOVEL AROID PRODUCTS

[75] Inventor: Joseph C. C. Tu, Kailua, Hi.

[73] Assignee: The United States of America as represented by the Secretary of Agriculture, Washington, D.C.

[21] Appl. No.: 55,116

[22] Filed: Jul. 5, 1979

[51] Int. Cl.³ .................... A23L 1/214; A23L 1/277; A23L 1/28
[52] U.S. Cl. .................................. 426/254; 426/615; 426/456; 426/654; 426/655
[58] Field of Search ............... 426/253, 254, 261, 615, 426/431, 442, 456, 518, 464, 655, 654

[56] References Cited
U.S. PATENT DOCUMENTS 2,105,977  1/1938  Ley et al. ............................ 426/456

OTHER PUBLICATIONS

Winton, Andrew L. et al., *The Structure and Composition of Foods*, 1935, pp. 131-134.
Hawley, Gessner G., *The Condensed Chemical Dictionary*, 8th ed, 1971, pp. 455-456.

Primary Examiner—Raymond N. Jones
Assistant Examiner—Elizabeth J. Curtin
Attorney, Agent, or Firm—M. Howard Silverstein; David G. McConnell; Theodore J. Leitereg

[57] ABSTRACT

Novel products are prepared from Aroid corms by first peeling and washing the corms and then cutting the corms into pieces. Aqueous alkali is applied to the corms to remove acid principles and then the corms are treated with aqueous hydrogen peroxide to prevent discoloration. The so-treated corms are washed with water until they are neutral and then dried.

10 Claims, No Drawings

4,246,289

NOVEL AROID PRODUCTS

BACKGROUND OF THE INVENTION

1. Field of the Invention:

This invention relates to and has among its objects novel products from Aroids (family Aracae) and novel methods of making the same. It is a particular object of the invention to reduce the acridity and decolorizability of Aroid material. Further objects of the invention will be evident from the following description wherein parts and percentages are by weight unless otherwise specified.

2. Description of the Prior Art:

Aroids (family Aracae) possess a corm, or a rounded thick modified underground stem base bearing membranous or scaly leaves and buds and acting as a vegetative reproductive structure in certain monocotyledonous plants, which may be prepared for human consumption. The most noted of the Aroids is taro, an important food crop in tropical and subtropical regions. To prepare taro corms for eating complicated cooking procedures are required because the corms contain acrid matter that produces irritation of the mucous membranes in the mouth and throat. The cooked product from taro called poi is very sticky and viscous and has a high moisture content. Consequently, poi is difficult to handle, dry, and store, thus, limiting its usefulness as a food. Only the surface of poi becomes dried under drying conditions and the dried material is unevenly colored. The cooling techniques involve pressure cooking in a retort for several hours, peeling, trimming, washing, and grinding; it is notable that ordinary cooking techniques, e.g., cooking in boiling water, are ineffective in preparing taro corms for consumption.

SUMMARY OF THE INVENTION

The invention described herein provides means for avoiding the problems outlined above. As a result of the method of the invention novel taro products can be obtained simply without resort to complicated processing techniques, particularly retorting for extended periods, heretofore required. The benefits of the invention are obtained by first peeling and washing the aroid corms. Then, the corms are cut into pieces, treated with alkali, and then washed to remove the alkali. Next, the corms are mixed with water containing hydrogen peroxide and then removed and dried. The alkaline solution after removal of the corms can be acidified to yield a gum-like substance useful as a thickening or smoothing agent.

The new products have the advantage of being dry and non-hydroscopic. Thus, they are easily stored and transported because, unlike poi, they require no refrigeration. Furthermore, they are easily prepared for consumption by simple cooking in boiling water for short periods.

Another advantage of the instant products is that they do not irritate mucous membranes in the mouth and throat. Thus, they are not subject to the unpleasantness associated with poi and other aroid products.

Another advantage of the invention is that it allows production of a gum from Aroids, which is useful as an emulsifying, thickening, and smoothing agent for creams, suspensions, and other colloidal food materials.

A further advantage of the invention is that it reduces discoloration of the Aroid material. As a result, the products of the invention have an attractive appearance.

DESCRIPTION OF THE PREFERRED EMBODIMENTS

The invention will next be described in detail with emphasis on novel products and methods for making them from the taro plant (*Colocassia esculenta*). It should be understood that this emphasis is by way of illustration and not limitation. In its broad ambit, the invention may be applied to all Aroids (family Aracae) including *Colocasia esculenta, Alocasia macrorrhiza, Xanthosoma, Schizmatoglottis calyptrata, Cyrtosperma chamissonis, Amorphophallus campanulatus,* and the like.

In a practice of the invention taro corms are peeled, washed and cut into pieces of any geometrical shape such as cubes, squares, rectangules, etc. Typically, the pieces have the following dimensions: cubes, about 10 millimeters (mm); squares, about $20 \times 20 \times 2$ mm; rectangules, $20 \times 10 \times 2$ mm. However, as a general rule the size of the pieces can vary but should not be so small as to lose their integrity during the process of the invention nor so large as to render the instant method ineffective.

The taro pieces are next extracted with an aqueous alkaline agent, such as sodium hydroxide, potassium hydroxide, calcium hydroxide, and the like, which is non-poisonous. Usually, the concentration of alkaline agent is about 2 to 5%, based on the weight of taro corms. The alkaline mixture is allowed to stand at room temperatue (about 20° C.) for a period of about 10-24 hours or a period of time sufficient to remove the acrid principles from the taro. It is within the scope of the invention to conduct the alkaline treatment within the temperature range of about 20°-30° C.

Following this alkaline treatment the taro pieces are separated from the alkaline extract and washed with water to remove the alkaline agent. The pH of the taro pieces should be about 9-10.

The so-extracted pieces are mixed with water in the ratio of 2-4 parts of water per part of taro. Then, sufficient food grade hydrogen peroxide is added such that the final concentration of hydrogen peroxide in the water is about 0.7-10% based on the weight of taro. Alternatively, the hydrogen peroxide can be mixed with water prior to combination with the taro pieces. In general, the concentration of hydrogen peroxide should be sufficient to decolorize the taro. For practical purposes the treatment with hydrogen peroxide is conducted at ambient (room) temperature although temperatures in the range of 20°-30° C. can be employed.

The treatment with hydrogen peroxide is carried out for a period sufficient to decolorize the taro. Usually, this occurs after a period of about 10-30 hours. Whether the decolorizing procedure has been effective can be determined by placing a piece of treated taro into boiling water. Absence of darkening on the surface of the taro piece indicates that the decolorization is completed.

After treatment with hydrogen peroxide, the pieces are separated and washed with water until the pH of the taro is neutral, i.e., about 6.5-7.5. Alternatively, the separated pieces can be washed and then allowed to stand in water until neutral pH is realized. The neutralized pieces are separated from the water and dried to a moisture content of about 5-10%. The pieces may be dried in air or by the application of heat as, for example, in an oven.

The new taro products of the invention may be stored and/or transported without refrigeration. To reconstitute (hydrate) them for consumption they may be placed in about 5–10 parts of water per part of dry taro. The reconstituted pieces are easily cooked requiring about one hour in boiling water and may be included in a number of recipes. If desired, the hydration solution may contain vitamins, minerals, and other nutrients, which are absorbed into the pieces and retained therein.

The alkaline extract, after removal of the taro pieces, can be acidified with dilute aqueous food grade acid such as hydrochloric acid, sulfuric acid, phosphoric acid, and the like. Acid should be added to attain a pH of about 3.5–4.5. The precipitate that forms is separated by conventional means such as by centrifugation, filtration, etc., and then dried as described above. The dried material swells in water and becomes highly hydrated to form a gum that can be used as an emulsifying, thickening, and smoothing agent in food preparations.

The process of the invention may be applied to partially cooked taro corms as well as uncooked. It is, therefore, the intent of this disclosure to include such a variation within the scope of the present method.

EXAMPLES

The invention is further demonstrated by the following illustrative examples.

EXAMPLE 1

Ten grams of uncooked taro corms were peeled and cut into small cubes, 1 cubic centimeter, and then were mixed with 20 ml of 0.25 N sodium hydroxide in a 150 ml jar. The jar was stoppered and allowed to stand at room temperature for 24 hours. The cubes were removed from the jar and washed with water several times. Then, the cubes (pH 9) were transferred to another jar containing 20 ml of water. To the jar was added 0.17 g of hydrogen peroxide (100%). The jar was stoppered and the contents were allowed to stand at room temperature for 10 hours or more. The cubes were removed from the jar and washed several times with water. The cubes were then suspended in water with stirring and held for a period of 2 hours, this process being repeated until the pH of the cubes was about 7.0.

The above procedure was repeated except that a 1.0 N sodium hydroxide solution was used in place of the 0.25 N solution.

The so-prepared cubes were separated and dried in air to a moisture content of 10%. The dried cubes were rehydrated by suspension in water (50 ml) and then cooked. The cooked taro pieces did not discolor and did not irritate mucous membranes in the mouth and throat when eaten.

EXAMPLE 2

The procedure of Example 1 was followed with the exception that the amount of hydrogen peroxide used was 0.14 and 0.07 g, respectively. The cooked taro cubes exhibited the same properties as those prepared in Example 1.

EXAMPLE 3

Two grams of taro slices (dark brown) heated for 10 minutes in boiling water mixed with 10 ml of water in a 150 ml flask. To the flask was added 10 ml of 0.25 N sodium hydroxide solution. The flask was loosely stoppered and allowed to stand at room temperature for one hour. The slices were removed from the alkaline solution and rinsed with water. The slices were mixed with 15 ml of water in a 150 ml flask and 0.10 g of hydrogen peroxide was added to the flask. The flask was loosely stoppered and allowed to stand at room temperature for 24 hours or more.

Another test was conducted in the same manner as above except that 0.20 g of hydrogen peroxide was used.

The so-prepared slices did not irritate mucous membranes in the mouth and throat when eaten and were not discolored.

EXAMPLE 4

The sodium hydroxide extract from Example 1, after removal of the taro cubes, was acidified to pH 4.0 by addition of hydrochloric acid. The precipitate that formed was separated by centrifugation and then dried to a moisture content of 10%.

The precipitate was hydrated in water (20 ml) to yield a gum-like substance, which may be used as a thickening agent in food preparations.

Having thus described my invention, I claim:

1. A process for preparing edible products from the corms of plants of the family Aracae, which comprises
    (a) peeling and washing uncooked corms,
    (b) cutting the corms of Step a into pieces,
    (c) treating the corms of Step b with 2–5% aqueous alkali, based on the weight of the corms, for a period of 10–24 hours at a temperature of about 20°–30° C.,
    (d) separating the corms of Step c from the aqueous alkali,
    (e) washing the corms of Step d with water,
    (f) treating the corms of Step c with water containing 0.7–10% hydrogen peroxide, based on the weight of corms, for a period of about 10–30 hours, in the ratio of one part of corms per 2–4 parts of water,
    (g) treating the corms of Step f with water to neutralize them, and
    (h) drying the corms of Step g to a moisture content of about 5–10%.

2. The process of claim 1 wherein the plant is *Colocasia esculenta.*

3. The process of claim 1 wherein the plant is Alocasia.

4. The process of claim 1 wherein the plant is Xanthosoma.

5. The process of claim 1 wherein the dried corms are prepared for consumption by a method, which comprises
    (a) treating the dried corms with water to hydrate them and
    (b) cooking the hydrated corms.

6. A dry, rehydratable product prepared by the process of claim 1.

7. A process for preparing a precipitate from the corms of plants of the family Aracae, said precipitate being rehydratable and as such being useful as an emulsifying, thickening, and smoothing agent in food preparations, which comprises
    (a) peeling and washing uncooked corms,
    (b) cutting the corms of Step a into pieces,
    (c) treating the corms of Step b with 2–5% aqueous alkali, based on the weight of corms, for a period of 10–24 hours at a temperature of about 20°–30° C.,
    (d) separating the corms of Step c from the aqueous alkali, (e) acidifying the aqueous alkali of Step d to pH 3.5–4.5 by addition of acid to obtain a precipitate, (f) separating the precipitate from the acidified aqueous alkali of Step e, and (g) drying the precipitate of Step f.

8. The process of claim 7 which further comprises treating the dried precipitate with water to hydrate it to a gum-like substance.

9. A precipitate capable of rehydration, prepared by the process of claim 7.

10. A gum-like substance useful as an emulsifying, thickening, and smoothing agent in food preparations prepared by the process of claim 8.

* * * * *

UNITED STATES PATENT AND TRADEMARK OFFICE
CERTIFICATE OF CORRECTION

PATENT NO. : 4,246,289

DATED : Jan. 20, 1981

INVENTOR(S) : Joseph C. C. Tu

It is certified that error appears in the above—identified patent and that said Letters Patent is hereby corrected as shown below:

Column 1, line 31, cancel "cooling" and insert --cooking--.

Column 3, line 65, cancel "water mixed" and insert --water were mixed--.

Column 4, line 35, cancel "Step c" and insert --Step e--.

Signed and Sealed this

Twenty-eighth Day of April 1981

[SEAL]

Attest:

RENE D. TEGTMEYER

Attesting Officer

Acting Commissioner of Patents and Trademarks